US009392106B2

(12) United States Patent
Pearse et al.

(10) Patent No.: US 9,392,106 B2
(45) Date of Patent: Jul. 12, 2016

(54) SYSTEM AND METHOD FOR REDUCING POWER CONSUMPTION IN TELECOMMUNICATION SYSTEMS

(75) Inventors: Sandy Pearse, Ottawa (CA); Tony D'Addona, Ottawa (CA); Steven Driediger, Ottawa (CA); Michel Patoine, Ashton (CA); Dmitri Garaschencko, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 642 days.

(21) Appl. No.: 13/206,291

(22) Filed: Aug. 9, 2011

(65) Prior Publication Data

US 2013/0042125 A1    Feb. 14, 2013

(51) Int. Cl.
*G06F 1/32* (2006.01)
*H04M 3/24* (2006.01)
*H04Q 1/02* (2006.01)

(52) U.S. Cl.
CPC .. *H04M 3/24* (2013.01); *H04Q 1/03* (2013.01)

(58) Field of Classification Search
CPC ...... G06F 1/3287; G06F 1/3234; H04M 3/24; H04Q 1/03
USPC ................... 713/300–324; 455/574
See application file for complete search history.

(56) References Cited

U.S. PATENT DOCUMENTS

| | | | |
|---|---|---|---|
| 6,089,456 A * | 7/2000 | Walsh et al. | 235/472.01 |
| 7,337,339 B1 * | 2/2008 | Choquette et al. | 713/320 |
| 7,418,608 B2 * | 8/2008 | Kumar et al. | 713/320 |
| 7,426,109 B2 | 9/2008 | Lindell et al. | |
| 7,849,338 B2 * | 12/2010 | Xiao | 713/320 |
| 2006/0053320 A1 * | 3/2006 | Lin | 713/300 |
| 2008/0307240 A1 * | 12/2008 | Dahan et al. | 713/320 |
| 2010/0064154 A1 | 3/2010 | King | |
| 2013/0124899 A1 * | 5/2013 | Liu | 713/324 |
| 2013/0132759 A1 * | 5/2013 | Lathrop et al. | 713/340 |

OTHER PUBLICATIONS

International Search Report dated Jul. 19, 2012 for PCT/CA2012/050493.

* cited by examiner

*Primary Examiner* — Thuan Du
(74) *Attorney, Agent, or Firm* — Kramer & Amado, P.C.

(57) ABSTRACT

Various exemplary embodiments relate to a method for controlling power consumption in a telecom system. The method includes selecting a power profile command based upon a desired power consumption and performance characteristic, translating the power profile command into at least one subcommand, and initiating at least one power reduction technique in a telecom component based upon the at least one subcommand.

17 Claims, 5 Drawing Sheets

| Profile | Capacity | Redundancy | Feature | Power Reduction |
|---|---|---|---|---|
| 1 | 100% | 100% | 100% | 0% |
| 2 | 50% | 100% | 100% | 10% |
| 3 | 100% | 0% | 100% | 25% |
| 4 | 100% | 100% | 50% | 30% |
| 5 | 75% | 0% | 50% | 50% |

SYSTEM AND METHOD FOR REDUCING POWER CONSUMPTION IN TELECOMMUNICATION SYSTEMS

TECHNICAL FIELD

Various exemplary embodiments disclosed herein relate generally to power consumption in telecom systems.

BACKGROUND

Typical telecom systems consume power at a rate unaffected, to any large degree, by the amount of system usage. When components in the telecom system are less than 100% loaded, or are idling, they may consume almost as much power as when fully loaded. Also, when telecom system components are in remote locations, they may rely upon solar and battery power to operate. Further, it may be acceptable at certain times to operate the telecom system with a lower reliability. Thus, there is a desire and need to reduce power consumption in telecom systems in various situations.

SUMMARY

A brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method for controlling power consumption in a telecom system, including: selecting a power profile command based upon a desired power consumption and performance characteristic; translating the power profile command into at least one subcommand; and initiating at least one power reduction technique in a telecom component based upon the at least one subcommand.

In some embodiments, the translating is performed by a telecom component. In some embodiments, the translating is performed by a control card. In some embodiments, the translating is performed by a network manager. In some embodiments, the power profile command is selected based upon at least one of capacity reduction, redundancy reduction, and feature reduction. In some embodiments, the method further includes reporting a power consumption of a telecom component. In some embodiments, the method further includes acknowledging a successful implementation of the power reduction technique. In some embodiments, initiating at least one power reduction technique includes transmitting the power profile command from a network manager.

Various exemplary embodiments further relate to a system for controlling power consumption in a telecom system, including: a network manager, wherein the network manager transmits a power profile command; a control card, wherein the control card receives the power profile command and translates the power profile command into at least one subcommand; and a telecom component, wherein the telecom component receives the at least one subcommand, and wherein the at least one subcommand instructs the telecom component to implement a power reduction technique.

In some embodiments, the telecom component implementing the power reduction technique is the control card. In some embodiments, the telecom component is at least one of a line card and a fan card. In some embodiments, the power profile command corresponds with at least one of a capacity reduction technique, a redundancy reduction technique, and a feature reduction technique. In some embodiments, the telecom component transmits power consumption information to the network manager. In some embodiments, the telecom component transmits acknowledgement information to the network manager upon a successful implementation of the power reduction technique.

Various exemplary embodiments further relate to a network manager in a telecom system, including: a power profile command generator that generates a power profile command; an interface, wherein the interface transmits the power profile command to a control card and receives power profile acknowledge information and power monitor information from the control card; and a display for displaying the power profile acknowledge information and the power monitor information.

In some embodiments, the network manager translates the power profile command into at least one subcommand. In some embodiments, the power profile command is transmitted to a control card. In some embodiments, the power profile acknowledge information is an aggregate of power profile acknowledge information from a plurality of telecom components. In some embodiments, the power monitor information is an aggregate of power monitor information from a plurality of telecom components. In some embodiments, the power profile command is based upon a capacity reduction technique, a redundancy reduction technique, and a feature reduction technique.

BRIEF DESCRIPTION OF THE DRAWINGS

In order to better understand various exemplary embodiments, reference is made to the accompanying drawings, wherein.

DETAILED DESCRIPTION

Figure 1:
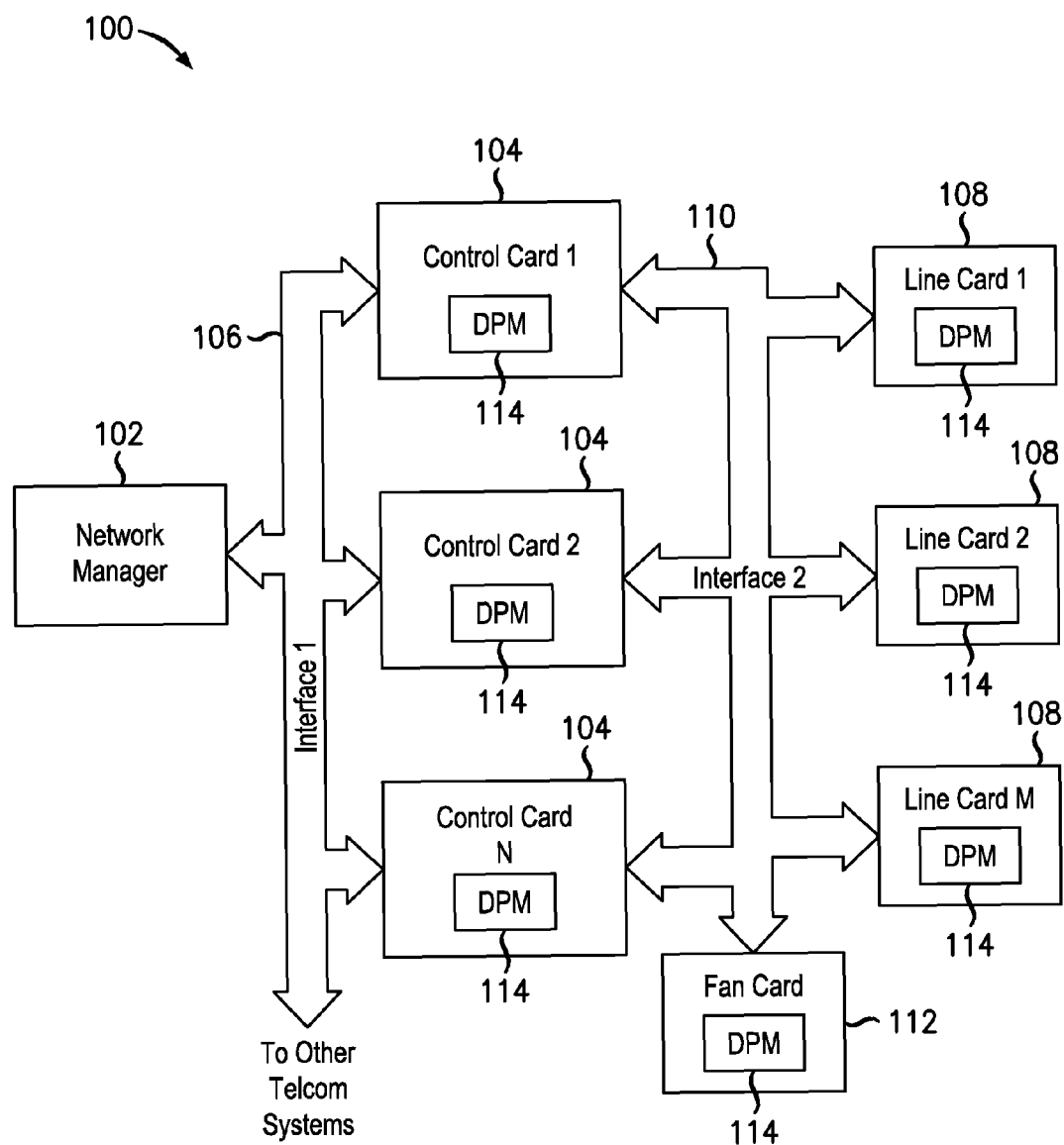
FIG. 1 illustrates an exemplary embodiment of a telecom system.

Referring now to the drawings, there are disclosed broad aspects of various exemplary embodiments.

When a telecom system is under-utilized, or when acceptable, power consumption may be reduced by scaling back system functionality. There are a number of operating modes with associated power profiles that may reduce system power consumption while maintaining certain levels of service. Various embodiments of the present invention may allow telecom operators to control system functionality and enable the associated power savings.

FIG. 1 illustrates an exemplary telecom system 100 according to an embodiment of the present invention. The telecom system 100 may include a network manager 102. The network manager 102 may generate power profile commands. The network manager 102 may be connected to 1-N control cards 104 via a first interface 106. The first interface 106 may further connect the network manager 102 to additional telecom systems (not shown). The first interface 106 may be, for example, an Ethernet network or other signal transmitting medium. The 1-N control cards 104 may include one or more control cards. Each of the 1-N control cards 104 may be connected to 1-M line cards 108 via a second interface 110. The second interface 110 may be, for example, an I2C bus or other signal transmitting medium. The second interface 110 may include one or more redundant interfaces. The second interface 110 may also connect each of the 1-N control cards 104 to at least one fan card 112. Additional telecom components (not shown) may also be included in the telecom system 100.

Each of the 1-N control cards 104 may include a digital power manager (DPM) 114. The 1-M line cards 108 and the fan card 112 may also include DPMs 114. The DPMs 114 may be integrated into each card or provided as a separate external module connected to each card.

While each of the telecom components may be illustrated in FIG. 1 as including a DPM, additional telecom components not having DPMs may be included in the telecom system 100.

Figure 2:
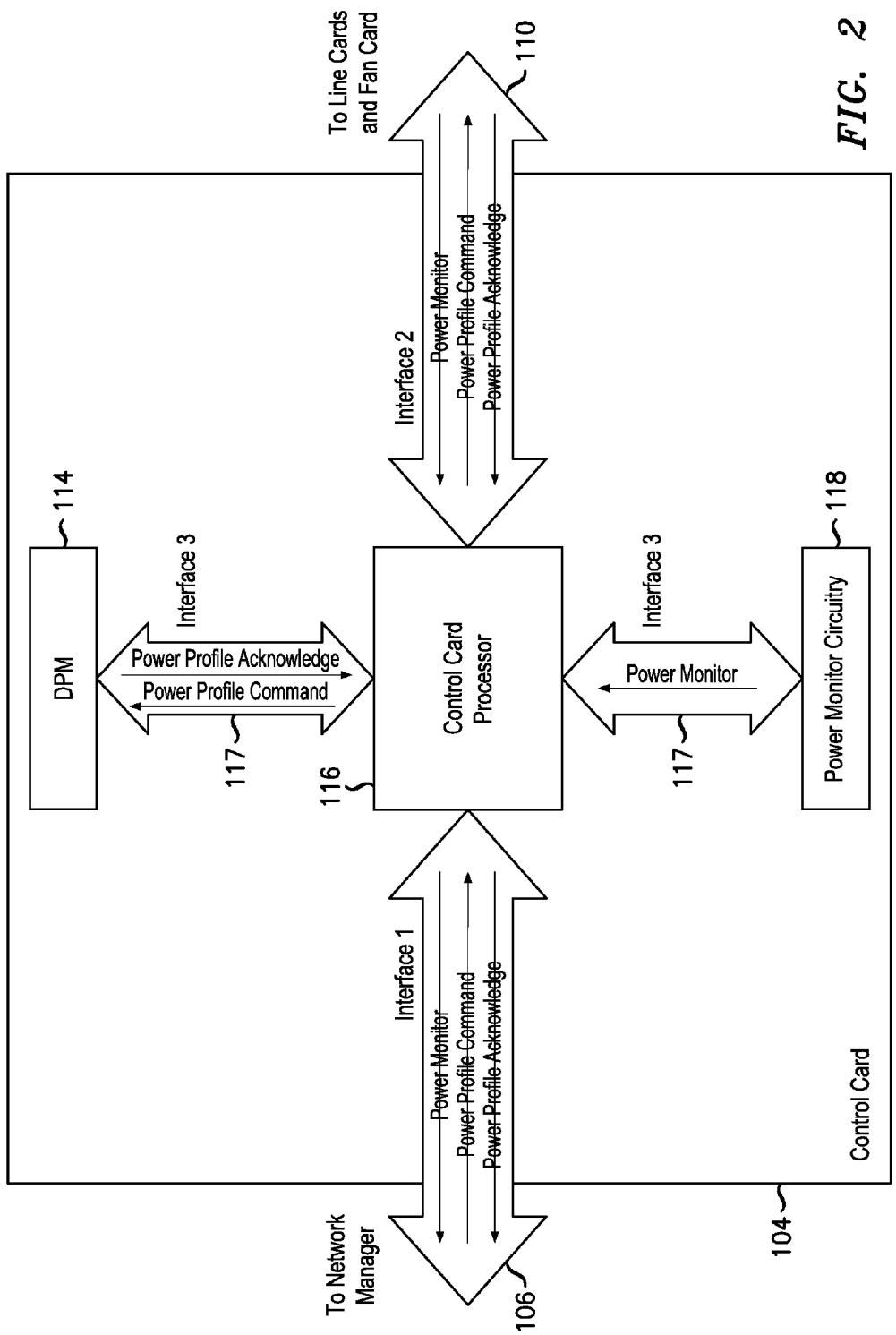
FIG. 2 illustrates an exemplary embodiment of a control card.

FIG. 2 illustrates an exemplary embodiment of a control card 104. The control card 104 may include a control card processor 116. The control card processor 116 may send and receive information from the first interface 106 and the second interface 110. The first interface 106 may be connected to the network manager 102, as illustrated in FIG. 1. The first interface 106 may be, for example, an Ethernet network or other signal transmitting medium. The second interface 110 may be connected to the line cards 108 and fan card 112, as illustrated in FIG. 1. The second interface 110 may further be connected to other types of cards and telecom components (not shown). The second interface 110 may be, for example, an I2C bus or other signal transmitting medium.

The control card 104 may include a DPM 114. The DPM 114 may be integrated in the control card 104 or provided as a separate external module connected to the control card 104. The DPM 114 may send and receive information from the control card processor 116 via a third interface 117. The third interface 117 may be, for example, an I2C bus or other signal transmitting medium. The DPM 114 may be integrated with the control card processor 116.

The control card 104 may further include power monitor circuitry 118. The power monitor circuitry may send power monitor information to the control card processor 116 via the third interface 117 or via another dedicated interface. The control card processor 116 may also receive power monitor information from other components in the telecom system, such as, for example, the line cards 108 and the fan card 112. The control card processor 116 may forward the power monitor information to the network manager 102 via the first interface 106. The control card processor 116 may aggregate and transmit all of the power monitor information to the network manager 102 or may forward each component's power monitor information individually.

The control card processor 116 may receive a power profile command from the network manager 102 over the first interface 106. The power profile command may be a high-level command, as further described below. The control card processor 116 may translate the high-level power profile command into one or more specific subcommands for one or more of the DPMs 114 in the telecom system 100. The control card processor 116 may transmit the subcommand to the DPM 114 managing the power of the control card 104. The control card processor 116 may also forward the power profile command or subcommands to the line cards 108, fan card 112, and/or other components in the telecom system 100. The subcommands may include specific implementation information for each of the components in the telecom system 100. The power profile command may instruct each component how to reduce or increase power consumption, as further described below.

Upon receiving and/or implementing the power profile command, the DPM 114 may transmit power profile acknowledge information to the control card processor 116. The control card processor 116 may receive additional power profile acknowledge information from the other DPMs managing the line cards 108, fan card 112, or other components in the telecom system 100. The control card processor 116 may forward the power profile acknowledge information received from the other DPMs to the network manager 102 over the first interface 106. The control card processor 116 may aggregate all of the power profile acknowledge information, or may forward each component's power profile acknowledge information individually.

Figure 3:
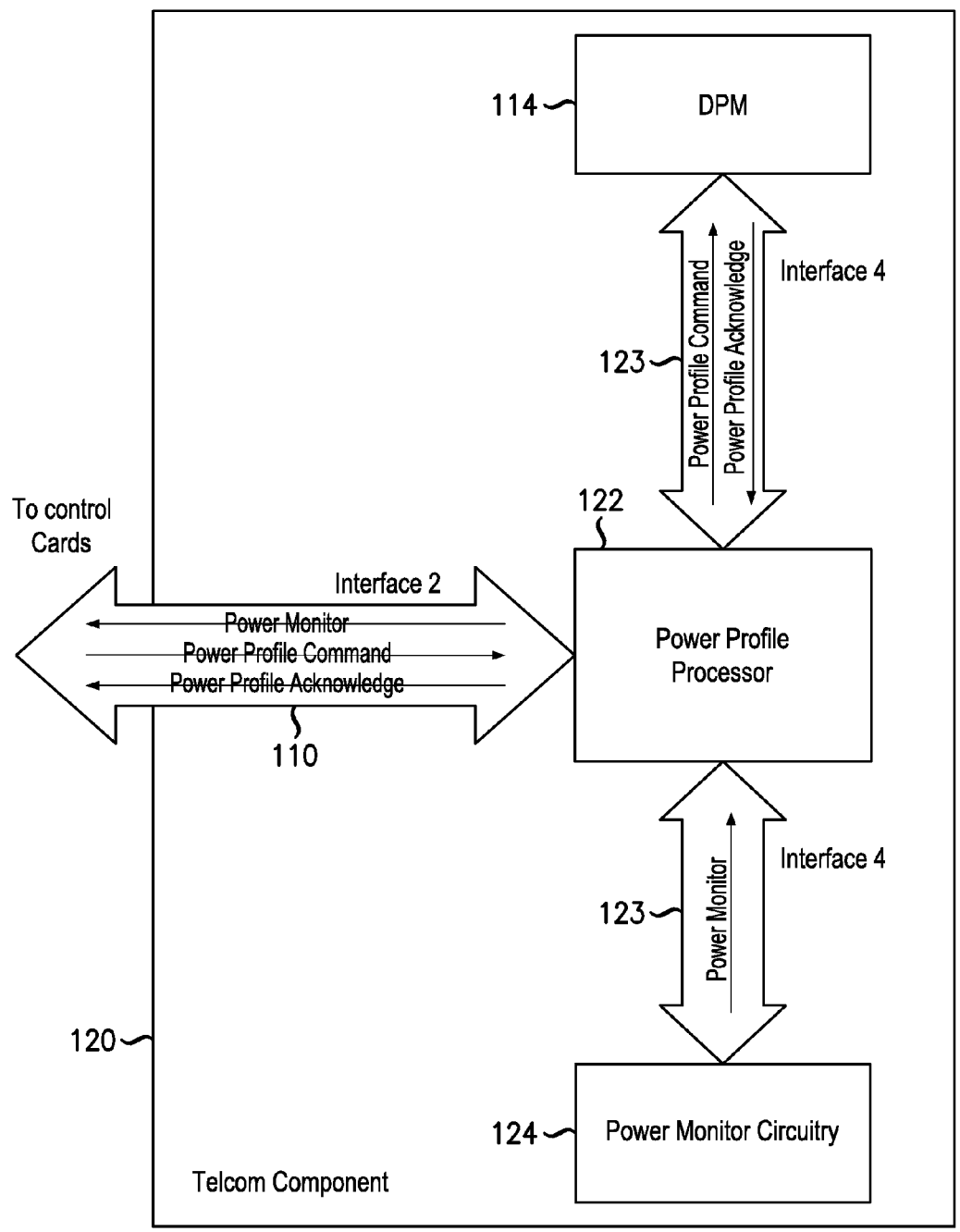
FIG. 3 illustrates an exemplary embodiment of a telecom component having a power profile processor.

FIG. 3 illustrates an exemplary embodiment of a telecom component 120 having a power profile processor 122. The telecom component 120 may be, for example, a line card 108 or a fan card 112. The power profile processor 122 may send and receive information from the second interface 110. The second interface 110 may be connected to the control cards 104, and to the other line cards 108 and/or fan card 112 as illustrated in FIG. 1. The second interface 110 may be, for example, an I2C bus or other signal transmitting medium.

The telecom component 120 may include a DPM 114. The DPM 114 may be integrated in the telecom component 120 or provided as a separate external module connected to the telecom component 120. The DPM 114 may send and receive information from the power profile processor 122 via a fourth interface 123. The fourth interface 123 may be, for example, an I2C bus or other signal transmitting medium. The DPM 114 may be integrated with the power profile processor 122.

The telecom component 120 may further include power monitor circuitry 124. The power monitor circuitry 124 may send power monitor information to the power profile processor 122 via the fourth interface 123 or other dedicated interface. The power profile processor 122 may forward the power monitor information to the control cards 104 via the second interface 110.

The power profile processor 122 may receive a power profile command or subcommand from the control cards 104 via the second interface 110. If a high-level power profile command is received, then the power profile processor 122 may translate the high-level power profile command into a specific subcommand for the DPM 114 managing the power of the telecom component 120. Once translated, the power profile processor 122 may forward the subcommand to the DPM 114. If a specific subcommand is received from the control cards 104, then the power profile processor 122 may forward the subcommand to the DPM 114 without further processing. The power profile command may instruct the telecom component 120 how to reduce or increase power consumption, as further described below.

Upon receiving and/or implementing the power profile command, the DPM 114 may transmit power profile acknowledge information to the power profile processor 122. The power profile processor 122 may forward the power profile acknowledge information to the control cards 104 via the second interface 110.

Figure 4:
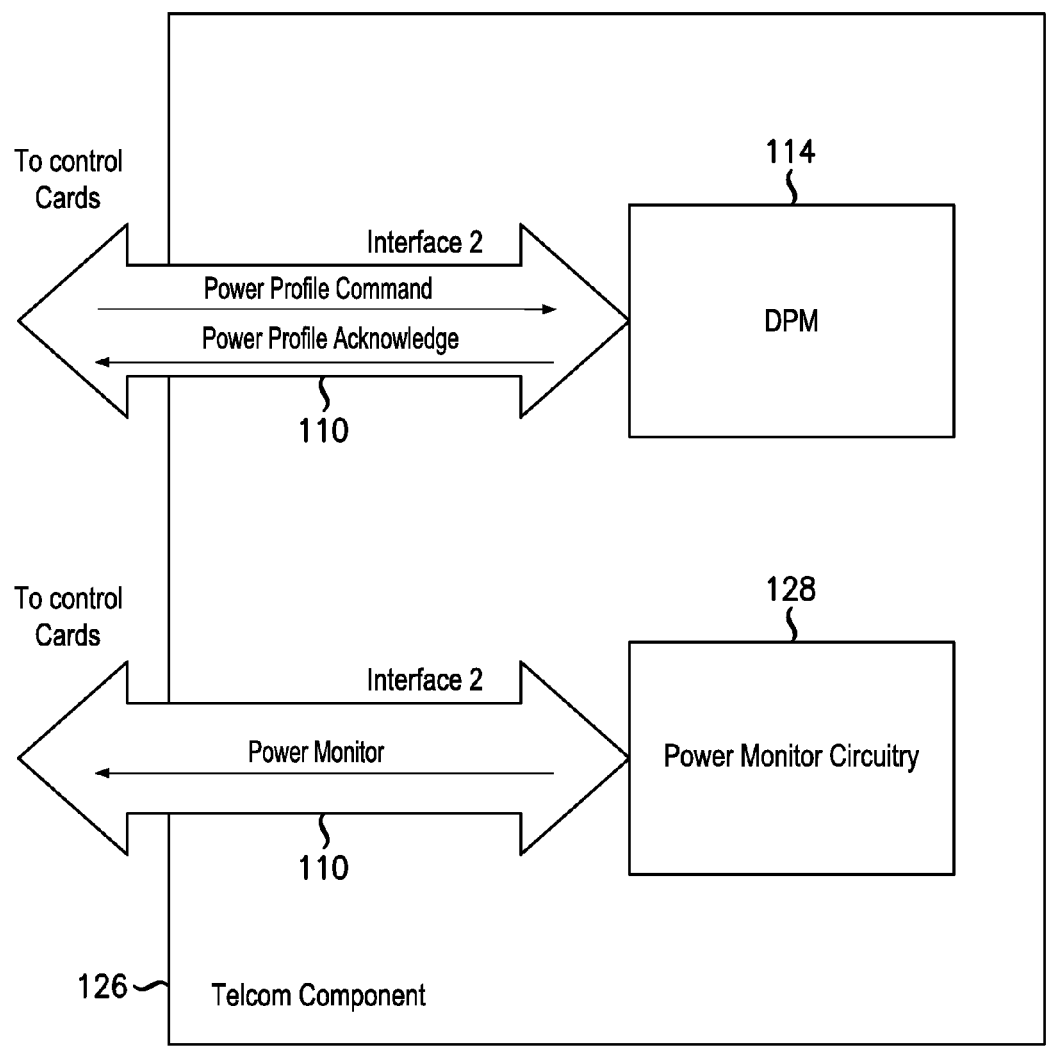
FIG. 4 illustrates an exemplary embodiment of a telecom component without a power profile processor.

FIG. 4 illustrates an exemplary embodiment of a telecom component 126 without a power profile processor. The telecom component 126 may be, for example, a line card 108 or a fan card 112.

The telecom component 126 may include a DPM 114. The DPM 114 may be integrated in the telecom component 126 or provided as a separate external module connected to the telecom component 126. The DPM 114 may send and receive information from the control cards 104 via the second interface 110 or via another dedicated interface.

The telecom component 126 may further include power monitor circuitry 128. The power monitor circuitry 128 may send power monitor information to the control cards 104 via the second interface 110 or via another dedicated interface.

The DPM 114 may receive a power profile command or subcommand from the control cards 104 via the second interface 110. Upon receiving and/or implementing the power profile command, the DPM 114 may transmit power profile acknowledge information to the control cards 104 via the second interface 110 or via another dedicated interface.

The network manager 102 may allow a telecom operator to manage the power consumption of telecom systems and components by dynamically controlling system parameters, such as, for example, system redundancy, system features, and system capacity. The parameters may be controlled based on the traffic volume of the system and/or the level of service desired by the telecom operator by using physical techniques.

The telecom operator may select a desired power profile or a desired category of power consumption techniques at the network manager 102. The power profile may determine a set of power consumption techniques that may alter the performance level of the telecom system 100. The categories of power consumption techniques may include, for example, feature reduction techniques, redundancy reduction techniques, capacity reduction techniques, and no reduction technique. The telecom operator may manage the categories of techniques network-wide, or across multiple nodes, by selecting a power profile or at least one of the power consumption categories, each of which may enable some reduction in power consumption of the telecom system 100. Based on the telecom operator's selection, the network manager 102 may select a power profile command that corresponds with the power profile or the power consumption category the operator selected, and may transmit the power profile command to the components in the telecom system 100. The power profile command may be a high-level command that may instruct the telecom components what power state to use. The power states may be, for example, 'normal', 'low-power', 'ultra-low-power', 'power state 1', 'power state 2', etc. One or more of the components in the telecom system 100 may translate the high-level power profile commands into specific subcommands that may enable the desired power state.

Figures 5, 6:
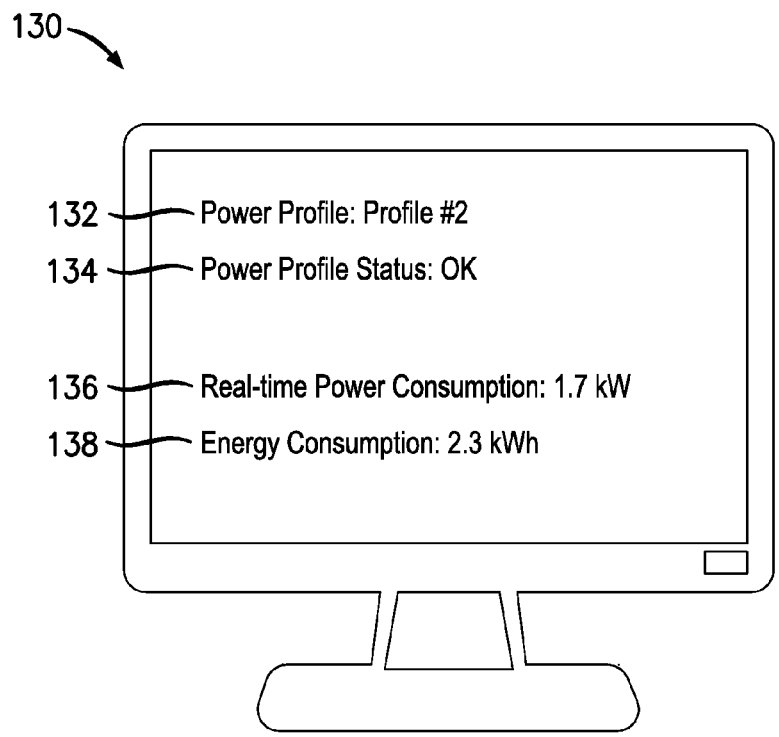
FIG. 5 illustrates an exemplary embodiment of a display for a network manager.
FIG. 6 illustrates various examples of power profile options.

The network manager 102 may include a user interface for a telecom operator to enter a desired category of power consumption. As illustrated in FIG. 5, the network manager 102 may include a display 130. The display 130 may display a current power profile 132, a status of the power profile 134, a real-time power consumption 136, and an energy consumption 138. The display 130 may also display other statistics and information pertaining to the telecom system 100.

Real-time power consumption may be reported to the network manager 102. The real-time power consumption may be obtained from the power monitor information from the power monitor circuitry in the telecom components. The network manager 102 may receive individual power monitor information from each of the telecom components, or aggregate power monitor information from the control cards 104. If individual power monitor information is received, then the network manager may aggregate the information into one power consumption statistic. The network manager 102 may report the aggregate power consumption statistic, individual power consumption statistics, or other sub-combinations of power consumption statistics. The network manager 102 may also report the energy consumption and other statistics useful in managing energy costs of the telecom system 100.

The network manager 102 may also receive power profile acknowledgement information from each of the telecom components, or aggregate power profile acknowledgement information from the control cards 104. If individual power profile acknowledgement information is received, then the network manager may aggregate the signals into one power profile status statistic. The network manager 102 may report the aggregate power profile acknowledgement statistic, individual power profile acknowledgement statistics, or other sub-combinations of power profile acknowledgement statistics. The status of the power profile may also be determined via the power monitor information. The power monitor information may allow the selected power profile to run in a 'closed loop' control mode, where the adjustments to the components in the telecom system 100 made in response to the selected power profile may be reported back to the telecom operator, providing acknowledgement that the power profile may be operating as intended.

If a telecom operator desires power reduction via capacity reduction techniques, then the operator may select the capacity reduction power reduction category or a power profile that includes capacity reduction techniques. The network manager 102 may then transmit a corresponding power profile command. The power profile command may include a high-level command and/or specific subcommands. The high-level command may be translated into specific subcommands by other components in the telecom system 100. The specific subcommands for capacity reduction may include, for example, 25% reduction in packet through-put or 50% reduction in packet through-put.

If a telecom operator desires power reduction via redundancy reduction techniques, then the operator may select the redundancy reduction power reduction category or a power profile that includes redundancy reduction techniques. The network manager 102 may then transmit a corresponding power profile command. The power profile command may include a high-level command and/or specific subcommands. The high-level command may be translated into specific subcommands by other components in the telecom system 100. The specific subcommands for redundancy reduction may include, for example, enabling/disabling redundant components, as further described in application Ser. No. 13/206,243, "System and Method for Power Redundant Components", incorporated by reference herein.

If a telecom operator desires power reduction via feature reduction techniques, then the operator may select the feature reduction power reduction category or a power profile that includes feature reduction techniques. The network manager 102 may then transmit a corresponding power profile command. The power profile command may include a high-level command and/or specific subcommands. The high-level command may be translated into specific subcommands by other components in the telecom system 100. The specific subcommands for feature reduction may include, for example, enabling/disabling features or groups of features in the telecom components, as further described in application Ser. No. 13/206,151, "System and Method for Power Reduction in Redundant Components", incorporated by reference herein.

The specific subcommands included in the power profile command may adjust the power consumption of the telecom system 100 via physical techniques that may be implemented in software and hardware by each component's DPM 114. The physical techniques include, for example, enabling disabling telecom components, enabling/disabling portions of the telecom components, enabling/disabling communication between telecom components, reducing the voltage/current of the power supply rails powering the telecom components, and/or adjusting the clock parameters of the telecom components.

FIG. 6 illustrates various examples of power profile options a telecom operator may select from. For example, the telecom operator may determine that a 50% reduction in system capacity is acceptable. The network manager 102 may then select power profile "2", which may result in a 10% reduction in the power consumption of the telecom system 100. Alternatively, the telecom operator may determine that 0% system redundancy is acceptable. The network manager 102 may then select power profile "3", which may result in a 25% reduction in the power consumption of the telecom system 100. Alternatively, the telecom operator may determine that a 50% reduction in system features is acceptable. The network manager 102 may then select power profile "4", which may result in a 30% reduction in the power consumption of the telecom system 100. Alternatively, the telecom operator may determine that a 50% reduction in power consumption is desired. The network manager 102 may then select power profile "5", which may result in the system's capacity being reduced to 75%, the system's redundancy being reduced to 0%, and the system's features being reduced to 50%. Alternatively, the telecom operator may directly select any of the power profiles. The telecom operator and network manager 102 may select from additional power profiles, reduction techniques, and power consumption levels. The profiles, categories, options, and values available in the network manager 102 may vary depending on the system's configuration.

The power consumption of each telecom component and/or telecom system may be optimized according to the level of service the telecom operator desires. The telecom operator may obtain significant reductions in power consumption by selecting a broad category of power reduction techniques. The specific implementation of the power reduction techniques may be carried out without further configuration by the telecom operator. The network manager 102 may be configured to automatically apply a desired power profile based upon certain conditions. The conditions may include, for example, time of day, day of the week, time of year, status of the system's power supply, and/or status of other system components. For example, if a system component such as the fan card 112 fails, the network manager 102 may be configured to automatically apply a power profile that allows the telecom system 100 to operate without the fan card 112. The DPMs 114 may allow complex hardware and software at the card level to be easily integrated into a telecom network because of the commonality and simplicity of the power profile commands at the network/system level.

During the planning and commissioning of a new telecommunications network or system, the telecom operator may determine which power reduction techniques are appropriate for the telecom system 100 under certain conditions. For example, from 12:00 am to 4:00 am each week night, certain system parameters may be set that result in a reduction of power consumption in the telecom system 100. The system parameters (i.e. redundancy, capacity, features) and the associated physical techniques needed to achieve these parameters may be determined by the telecom operator and associated with a power profile for future use. Once the initial commissioning of the telecommunications network is complete, the network manager 102 may instruct the components in the telecom system to enter the power profile from 12:00 am to 4:00 am each week night. Additional system parameters may be associated with other power profiles during the initial commissioning of the telecommunication network or system. Then during normal operation of the telecom system 100, only high-level power profile commands may be needed to modify the power consumption of the telecom system 100.

Embodiments of the present invention may include managing the power consumption of legacy systems and components having limited power control features, as well as modern systems and components having numerous power control features. Embodiments of the present invention may incorporate both legacy and modern systems and components.

It should be apparent from the foregoing description that various exemplary embodiments of the invention may be implemented in hardware and/or firmware. Furthermore, various exemplary embodiments may be implemented as instructions stored on a non-transitory machine-readable storage medium, which may be read and executed by at least one processor to perform the operations described in detail herein. A non-transitory machine-readable storage medium may include any mechanism for storing information in a form readable by a machine, such as a personal or laptop computer, a server, or other computing device. Thus, a non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method for controlling power consumption in a telecom system, comprising:
   receiving, by a telecom component from a network manager, a selected power profile command comprising an identification of a desired power consumption and performance characteristic;
   translating, by the telecom component, the power profile command into at least one corresponding subcommand comprising an identification of a physical technique for achieving the desired power consumption and performance characteristic in the telecom component; and
   initiating the physical technique in the telecom component based upon the at least one subcommand.

2. The method of claim 1, wherein the power profile command is selected based upon at least one of capacity reduction, redundancy reduction, and feature reduction.

3. The method of claim 1, further comprising:
   reporting a power consumption of a telecom component.

4. The method of claim 1, further comprising:
   acknowledging a successful implementation of the physical technique.

5. The method of claim 1, wherein initiating at least one physical technique includes transmitting the power profile command from a network manager.

6. A system for controlling power consumption in a telecom system, comprising:
- a network manager, wherein the network manager transmits a power profile command comprising an identification of a desired power consumption and performance characteristic;
- a control card, wherein the control card receives the power profile command and forwards the power profile command to at least one other component; and
- a telecom component, wherein the telecom component receives the power profile command from the control card and translates the power profile command into at least one corresponding subcommand comprising an identification of physical technique for achieving the desired power consumption and performance characteristic, and
- wherein the at least one subcommand instructs the telecom component to implement the physical technique.

7. The system of claim 6, wherein the telecom component implementing the physical technique is the control card.

8. The system of claim 6, wherein the telecom component is at least one of a line card and a fan card.

9. The system of claim 6, wherein the power profile command corresponds with at least one of a capacity reduction technique, a redundancy reduction technique, and a feature reduction technique.

10. The system of claim 6, wherein the telecom component transmits power consumption information to the network manager.

11. The system of claim 6, wherein the telecom component transmits acknowledgement information to the network manager upon a successful implementation of the physical technique.

12. A network manager in a telecom system, comprising:
- a power profile command generator that generates a power profile command comprising an identification of a desired power consumption and performance characteristic;
- an interface, wherein the interface:
  - transmits via the telecom system the power profile command to a control card in a telecom component, and
  - receives power profile acknowledge information and power monitor information from the control card via the telecom system in response to the control card initiating a physical technique for achieving the desired power consumption and performance characteristic; and
- a display for displaying the power profile acknowledge information and the power monitor information.

13. The network manager of claim 12, wherein the network manager translates the power profile command into at least one corresponding subcommand comprising an identification of the physical technique.

14. The network manager of claim 12, wherein the power profile command is transmitted to a control card.

15. The network manager of claim 12, wherein the power profile acknowledge information is an aggregate of power profile acknowledge information from a plurality of telecom components.

16. The network manager of claim 12, wherein the power monitor information is an aggregate of power monitor information from a plurality of telecom components.

17. The network manager of claim 12, wherein the power profile command is based upon a capacity reduction technique, a redundancy reduction technique, and a feature reduction technique.

* * * * *